United States Patent
Song et al.

(10) Patent No.: US 9,957,382 B2
(45) Date of Patent: May 1, 2018

(54) FIBER-REINFORCED PLASTIC COMPOSITION, AND FIBER-REINFORCED COMPOSITE WITH IMPROVED IMPACT PERFORMANCE, PREPARED THEREFROM

(71) Applicant: LG Hausys, Ltd., Seoul (KR)

(72) Inventors: Kang-Hyun Song, Anyang-si (KR); Hee-June Kim, Seongnam-si (KR); Yong-Kil Kil, Gimpo-si (KR); Ae-Ri Oh, Anyang-si (KR); Sung-Min Kim, Seoul (KR)

(73) Assignee: LG Hausys, Ltd., Seoul (KR)

( * ) Notice: Subject to any disclaimer, the term of this patent is extended or adjusted under 35 U.S.C. 154(b) by 0 days. days.

(21) Appl. No.: 15/305,103

(22) PCT Filed: Apr. 2, 2015

(86) PCT No.: PCT/KR2015/003281
§ 371 (c)(1),
(2) Date: Oct. 19, 2016

(87) PCT Pub. No.: WO2015/163599
PCT Pub. Date: Oct. 29, 2015

(65) Prior Publication Data
US 2017/0044358 A1 Feb. 16, 2017

(30) Foreign Application Priority Data
Apr. 24, 2014 (KR) .......................... 10-2014-0049241

(51) Int. Cl.
| | | |
|---|---|---|
| *C08L 23/12* | (2006.01) | |
| *C08J 5/04* | (2006.01) | |
| *C08K 7/02* | (2006.01) | |
| *C08K 7/14* | (2006.01) | |
| *C08L 21/00* | (2006.01) | |
| *C08J 3/00* | (2006.01) | |
| *C08J 3/20* | (2006.01) | |

(52) U.S. Cl.
CPC .............. *C08L 23/12* (2013.01); *C08J 3/005* (2013.01); *C08J 3/203* (2013.01); *C08J 5/04* (2013.01); *C08K 7/02* (2013.01); *C08K 7/14* (2013.01); *C08L 21/00* (2013.01); *C08J 2323/12* (2013.01); *C08J 2323/26* (2013.01); *C08L 2207/04* (2013.01)

(58) Field of Classification Search
CPC ...... C08L 23/12; C08L 21/00; C08L 2207/04; C08J 3/005; C08J 3/203; C08J 7/02; C08J 7/14; C08J 5/04; C08J 2323/12; C08J 2323/26
See application file for complete search history.

(56) References Cited

U.S. PATENT DOCUMENTS

| | | | |
|---|---|---|---|
| 4,983,647 A * | 1/1991 | Ueno .................. | C08K 3/34 523/220 |
| 6,284,833 B1 | 9/2001 | Ford et al. | |
| 2007/0018357 A1* | 1/2007 | Ando .................. | B29C 31/085 264/319 |
| 2009/0163665 A1 | 6/2009 | Ellul et al. | |
| 2011/0130487 A1* | 6/2011 | Noh .................... | C08L 1/00 524/35 |
| 2014/0242335 A1 | 8/2014 | Kondo et al. | |
| 2014/0309331 A1 | 10/2014 | Liu et al. | |

FOREIGN PATENT DOCUMENTS

| | | |
|---|---|---|
| EP | 2796497 A1 | 10/2014 |
| EP | 2910605 A1 | 8/2015 |
| JP | 2011-137077 A | 7/2011 |
| KR | 20030025062 A | 3/2003 |
| KR | 10-2003-0026675 A | 4/2003 |
| KR | 10-0608138 B1 | 8/2006 |
| KR | 100608138 B1 * | 8/2006 |
| KR | 10-0714193 B1 | 5/2007 |
| KR | 10-2008-0061077 A | 7/2008 |
| KR | 101328296 B1 | 11/2013 |
| WO | 2013035764 A1 | 3/2013 |
| WO | 2013094763 A1 | 6/2013 |
| WO | 2014147103 A1 | 9/2014 |

OTHER PUBLICATIONS

International Search Report dated Jun. 29, 2015 corresponding to International Application No. PCT/KR2015/003281.
Park E H, "Polyamide resin composition comprises polyamide resin, glass fiber, inorganic clay, thermoplastic olefin-based elastomer and polyphenylene maleimide copolymer", Mar. 28, 2003, vol. 2003, Nr:49, WPI / 2017 Clarivate Analytics.
European Search Report dated May 4, 2017, corresponding to European Publication No. 15783906.9, citing the above reference(s).
Korean Office Action dated Mar. 14, 2017 in connection with the counterpart Korean Patent Application No. 10-2014-0049241, citing the above reference(s).

\* cited by examiner

*Primary Examiner* — Robert Jones, Jr.
(74) *Attorney, Agent, or Firm* — Hauptman, Ham LLP

(57) ABSTRACT

Disclosed herein are a fiber-reinforced plastic composition containing a thermoplastic resin, a reactive rubber (reactor-made thermoplastic poly olefin, RTPO), and a glass fiber; and a fiber-reinforced composite prepared from the fiber-reinforced plastic composition. Furthermore, provided is a method for preparing a fiber-reinforced composite, the method comprising the steps of: preparing a thermoplastic resin composition by feeding a thermoplastic resin and a reactive rubber into a first extruder, followed by melting and kneading; preparing a fiber-reinforced plastic composition by feeding the prepared thermoplastic resin composition and a fiber into a second extruder, followed by kneading; and molding the prepared fiber-reinforced plastic composition to prepare a fiber-reinforced composite.

15 Claims, 1 Drawing Sheet

—— Thermoplastic resin
—— Reactive rubber

—— Thermoplastic resin
• Rubber particles

FIBER-REINFORCED PLASTIC COMPOSITION, AND FIBER-REINFORCED COMPOSITE WITH IMPROVED IMPACT PERFORMANCE, PREPARED THEREFROM

CROSS REFERENCE to RELATED APPLICATION

This application claims priority of Korean Patent Application No. 10-2014-0049241, filed on Apr. 24, 2014 in the KIPO (Korean Intellectual Property Office). Further, this application is the National Phase application of International Application No. PCT/KR2015/003281 filed Apr. 2, 2015, which designates the United States and was published in Korean.

TECHNICAL FIELD

The present disclosure relates to a fiber-reinforced plastic composition, and a fiber-reinforced composite with improved impact performance prepared therefrom

BACKGROUND ART

In general, a fiber-reinforced composite utilizing a thermoplastic polypropylene resin can be formed by impregnating a modified propylene to which a thermoplastic resin comprising a propylene-ethylene copolymer and a polar functional group are grafted and a polyolefin polyol containing a hydroxyl group into a continuous fiber such as glass/carbon. Such composite is excellent in impact resistance as well as in strength and rigidity.

In this case, the impregnation of the thermoplastic resin into the continuous fiber is a factor that gives a significant effect on improving the mechanical properties and impact properties of the long-fiber composite. If the impregnation of the two materials is low, the continuous fibers are not bonded in the thermoplastic resin, and cracks and pores may be formed in the composite, which can in turn adversely affect the physical properties of the composite.

Thus, although a compatibilizer has been used to improve the impregnation of the thermoplastic resin into the continuous fiber, such treatment with the compatibilizer is no longer activated in more than a certain amount. Further, an excessive treatment may adversely affect the physical properties, and has only limited control over the strength, rigidity and impact performance. Therefore, the need for a study of the factors that can enhance the impact performance in addition to the use of the compatibilizer has emerged.

DISCLOSURE

Technical Problem

It is an aspect of the present disclosure to provide a fiber-reinforced plastic composition with excellent high-speed impact performance compared to a conventional plastic composition due to the nature of a reactive rubber which is to be incorporated into a thermoplastic resin and a glass fiber.

It is another aspect of the present disclosure to provide a fiber-reinforced composite formed from the fiber-reinforced plastic composition and a method of preparing the same.

Technical Solution

In one embodiment of the present disclosure, a fiber-reinforced plastic composition is provided including a thermoplastic resin, a reactive rubber (reactor-made thermoplastic poly olefin, RTPO), and a fiber.

The composition may include about 1 part by weight to about 20 parts by weight of the reactive rubber, and about 5 parts by weight to about 45 parts by weight of the fiber, relative to 100 parts by weight of the thermoplastic resin.

The thermoplastic resin may include, but is not limited to, at least one selected from the group consisting of an aromatic vinyl-based resin, a rubber-modified aromatic vinyl-based resin, a polyphenylene ether based resin, a polycarbonate based resin, a polyester based resin, a methacrylate based resin, a polyarylene sulfide based resin, a polyamide based resin, a polyvinyl chloride based resin, a polyolefin based resin, and combinations thereof.

The polyolefin resins may include a polypropylene resin, wherein the polypropylene resin may be a propylene homopolymer or an ethylene-propylene polymer. The reactive rubber may be formed by a polymerization of rubber components onto polypropylene chains.

The rubber components may be at least one selected from the group consisting of an ethylene-propylene-based rubber, α-olefin-based rubber, a styrene-based thermoplastic elastomer, and combinations thereof.

The fiber may be at least one selected from the group consisting of glass fiber, basalt fiber, carbon fiber, aramid fiber, and combinations thereof.

The glass fiber may have an average diameter of about 15 μm to about 20 μm.

The composition may further include an additive.

The additive may be at least one selected from the group consisting of an antioxidant, a heat stabilizer, a dispersant, a compatibilizer, a pigment, and combinations thereof.

In another embodiment of the present disclosure, there is provided a fiber-reinforced composite formed from the fiber-reinforced plastic composition.

The fiber-reinforced composite may have a flexural modulus of about 5 GPa to about 6 GPa.

The fiber-reinforced composite may have impact absorption energy of about 1.5 J to about 3 J.

The fiber-reinforced composite may have falling ball impact strength of about 5 J/mm to about 7 J/mm.

In a further embodiment of the present disclosure, a method of producing a fiber-reinforced composite is provided, the method including: introducing a thermoplastic resin and a reactive rubber into a first extruder, followed by melt-kneading, to form a thermoplastic resin composition; introducing the formed thermoplastic resin composition and a fiber into a second extruder, followed by kneading, to form a fiber-reinforced plastic composition; and molding the formed fiber-reinforced plastic composition to form the fiber-reinforced composite.

The step of molding the formed fiber-reinforced plastic composition to form the fiber-reinforced composite may include continuously extruding the formed fiber-reinforced plastic composition using an extrusion die to form an extrudate having a constant size and shape; and press-molding the formed extrudate to produce the fiber-reinforced composite.

Advantageous Effects

The fiber-reinforced plastic composition is capable of enhancing the compatibility between the thermoplastic resin and the fiber.

The fiber-reinforced composite can realize superior high-speed impact performance while maintaining strength and rigidity.

The method of producing a fiber-reinforced composite can be used to achieve high strength, high rigidity and excellent high-speed impact strength, and therefore applicable to components of automobile parts such as a back beam, a seat bag, a bonnet roof, and the like.

BEST MODE

Hereinafter, embodiments of the present disclosure will be described in detail with reference to the accompanying drawings. It should be understood that the present disclosure is not limited to the following embodiments, and that the embodiments are provided for illustrative purposes only. The scope of the disclosure should be defined only by the accompanying claims and equivalents thereof.

In one embodiment of the present disclosure, a fiber-reinforced plastic composition is provided including a thermoplastic resin, a reactive rubber (Reactor-made thermoplastic poly olefin, RTPO), and a fiber.

The fiber-reinforced plastic composition may include a reactive rubber (Reactor-made thermoplastic poly olefin, RTPO). For example, the reactive rubber is a rubber in which the content of an ethylene-propylene rubber is enhanced during a polymerization of propylene, and can improve the impact properties of the fiber-reinforced plastic composition while minimizing a treatment with a separate rubber resin or rubber particles.

Specifically, the reactive rubber (RTPO) may be a reactive polyolefin, preferably a reactive polypropylene. As used herein, the reactive polypropylene refers to a polymer having rubber properties which is polymerized by incorporating propylene monomers, and may be for example a copolymer in which the proportion of the propylene monomer is about 20 mole % to about 80 mole %, or a resin in which reactive functional groups are grafted onto polypropylene.

A conventional rubber has disadvantages of failing to achieve fluidity and impact properties simultaneously, and occurring entanglement of reactants between the rubber and the other resins during process. However, the present composition enables to excellently achieve both the fluidity within a resin and the impact resistance of the resin itself at the same time by incorporating the reactive rubber.

Figure 2:
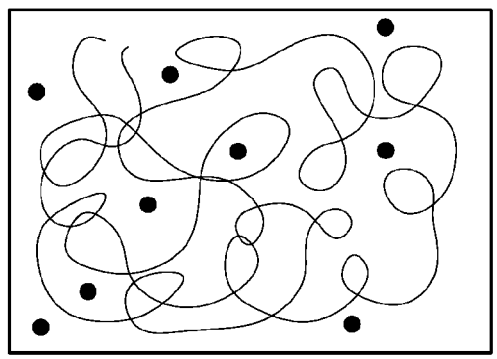
FIG. 2 shows a configuration in which rubber particles are dispersed and distributed into a thermoplastic resin in the prior art.

FIG. 2 shows a configuration in which rubber particles are dispersed and distributed into a thermoplastic resin in the prior art. As shown in FIG. 2, although in the case of using a rubber resin, in addition to the thermoplastic resin used as a matrix, the composition can exhibit the impact resistance due to the rubber resin, the addition of such general rubber resin or rubber particles deteriorates the compatibility and flowability, and may cause a problem in processability. Further, the dispersion or distribution of a polar rubber into a non-polar thermoplastic resin matrix including polypropylene may cause a phase separation due to the opposite polarity between them.

Figure 1:
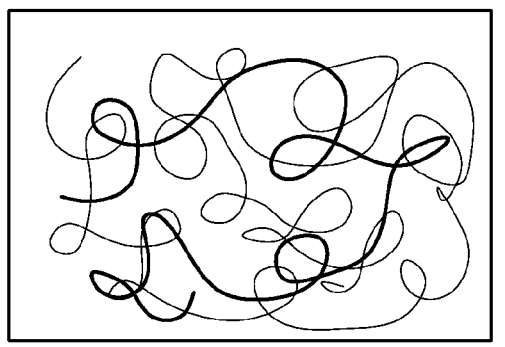
FIG. 1 shows a configuration in which a reactive rubber is dispersed and distributed into a thermoplastic resin in accordance with the present disclosure.

Meanwhile, FIG. 1 shows a configuration in which a reactive rubber is dispersed and distributed into a thermoplastic resin in accordance with the present disclosure. As shown in FIG. 1, the phase separation can be inhibited by using a reactive rubber in addition to the thermoplastic resin used as a matrix, and therefore the reactive rubber can evenly be dispersed in the thermoplastic resin. In addition, during the process of the fiber-reinforced plastic composition comprising a thermoplastic resin, a reactive rubber and a fiber, it is possible to maximize the impact resistance together with the increased compatibility.

The reactive rubber (Reactor-made thermoplastic poly olefin, RTPO) has an increased content of ethylene-propylene rubber, and the use of such rubber allows a modification of the impact properties while minimizing a separate rubber processing. The reactive rubber can be included in an amount of about 1 part by weight to about 10 parts by weight, and the fiber can be included in an amount of about 10 parts by weight to about 50 parts by weight, with respect to 100 parts by weight of the thermoplastic rubber. For example, the reactive rubber can be included in an amount of about 5 parts by weight to about 10 parts by weight, and the fiber can be included in an amount of about 25 parts by weight to about 45 parts by weight, with respect to 100 parts by weigh of the thermoplastic rubber If the reactive rubber is contained in an amount of less than about 1 part by weight with respect to 100 parts by weight of the thermoplastic resin, the impact properties of the rubber may not be expressed, whereas if it is contained more than about 20 parts by weight, although the impact performance may be improved, the strength and rigidity of the product formed from the composition may be lowered. Within the above mentioned ranges, it is advantageous in that the strength and rigidity can be preserved and the impact properties can also be improved. In addition, the inclusion of the fiber allows a higher mechanical strength and rigidity that cannot be expressed in a conventional thermoplastic resin, while maintaining a processability.

The thermoplastic resin may include, but is not limited to, at least one selected from the group consisting of an aromatic vinyl-based resin, a rubber-modified aromatic vinyl-based resin, a polyphenylene ether based resin, a polycarbonate based resin, a polyester based resin, a methacrylate based resin, a polyarylene sulfide based resin, a polyamide based resin, a polyvinyl chloride based resin, a polyolefin based resin, and combinations thereof. Specifically, the polyolefin based resin may be a polypropylene resin, and the polypropylene resin may be a propylene homopolymer or an ethylene-propylene copolymer.

The reactive rubber may be formed by a polymerization of rubber components onto polypropylene chains. For example, the rubber components may be at least one selected from the group consisting of an ethylene-propylene based rubber, α-olefin based rubber, a styrene based thermoplastic elastomer, and combinations thereof.

The fiber may be at least one selected from the group consisting of glass fiber, basalt fiber, carbon fiber, aramid fiber, and combinations thereof. For example, glass fiber, which is surface treated, for polyolefin, may be used. The average diameter and length of the glass fiber are not limited.

The average diameter of the glass fiber may be about 15 μm to about 20 μm, such as about 16 μm to about 19 μm. The average diameter of the glass fiber can be maintained within such ranges, such that the production of a fiber-reinforced composite can be facilitated, and an economic manufacture thereof can be maximized.

The fiber-reinforced plastic composition may further include an additive in addition to the thermoplastic resin and the reactive rubber. The additive may be at least one selected from the group consisting of an antioxidant, a heat stabilizer, a dispersant, a compatibilizer, a pigment, and combinations thereof. For example, the additives may be contained from about 1 part to about 10 parts by weight based on 100 parts by weight of the thermoplastic resin.

Specifically, among the additives, a heat stabilizer and a compatibilizer can be used, wherein the compatibilizer can increase the compatibility between the thermoplastic resin and the fiber. The heat stabilizer may be used in an amount of about 1 part by weight to about 3 parts by weight based on 100 parts by weight of the thermoplastic resin, and the compatibilizer may be used in an amount of about 1 part by weight to about 7 parts by weight based on 100 parts by weight of the thermoplastic resin. The use of the compatibilizer out of the above ranges may deteriorate the physical properties of the fiber-reinforced plastic composition.

Another embodiment of the present disclosure is a fiber-reinforced composite formed from the fiber-reinforced plastic composition comprising a thermoplastic resin, a reactive rubber (Reactor-made thermoplastic poly olefin, RTPO), and a fiber.

The fiber-reinforced composite can be formed from the fiber-reinforced plastic composition comprising a reactive rubber to improve a high-speed impact performance.

Typical fiber-reinforced composite has advantages of having a high strength and rigidity by controlling the contents of the polymer resin and the glass fiber used as a matrix. However, methods of improving the impact performance are limited such as by controlling the weight of a compatibilizer or changing a polymer resin used as a matrix.

Thus, the compatibility between the reactive rubber and the thermoplastic resin can be increased by allowing the fiber-reinforced composite to include a thermoplastic resin and a reactive rubber in which rubbers are polymerized onto polymer chains, whereby the impact resistance of the reactive rubber can be applied to the fiber-reinforced composite to improve the impact resistance thereof with high strength and rigidity.

The fiber-reinforced composite can have a flexural modulus in a range of about 5 GPa to about 6 GPa. As used herein, the flexural modulus refers to a ratio of stress and deformation of an object deformed under an external load to restore its original shape when the load is omitted. The inclusion of the reactive rubber allows the composite to have improved flexural modulus to restore its original shape even under external impact. The flexural modulus of the composite can be controlled by the contents of the reactive rubber and the fiber. The composite can be utilized to automotive components, and depending on the applications, the content of the reactive rubber and the fiber can be controlled.

The fiber-reinforced composite can have impact absorption energy of about 1.5 J to about 3 J. The impact absorption energy refers to a numerical value that is calculated from the impulse of the composite received from any object. Since such impulse that can be absorbed increases by comprising a reactive rubber, the impact resistance can therefore be improved together with the strength and rigidity.

Further, a falling ball impact strength of the fiber-reinforced plastic composite can be about 5 J/mm and about 7 J/mm. The falling ball impact strength is indicated by a resistance of an object to withstand a momentarily concentrated external force. The resistance to withstand the external force applied to the composite can be improved by incorporating a reactive rubber into the composite.

In a further embodiment of the present disclosure, a method of producing a fiber-reinforced composite is provided, the method including melt-kneading a thermoplastic resin and a reactive rubber in a first extruder to form a thermoplastic resin composition; kneading the thermoplastic resin composition as formed and a fiber in a second extruder to form a fiber-reinforced plastic composition; and molding the fiber-reinforced plastic composition as formed to form the fiber-reinforced composite.

In addition, the step of molding the fiber-reinforced plastic composition as formed to form the fiber-reinforced composite may include continuously extruding the fiber-reinforced plastic composition as formed using an extrusion die to produce an extrudate having a constant size and shape; and press-molding the extrudate as produced to produce the fiber-reinforced composite.

The method of producing a fiber-reinforced composite may include LFT-D (Long Fiber Reinforced Thermoplastic-Direct Compounding) extruder consisting of a first and second extruder, and a press molding machine, wherein each of the steps may be combined in sequence, such that the extruder and the machine can be operated in a continuous process.

A thermoplastic resin and a reactive rubber are subjected to a melt kneading in a first extruder equipped with a twin screw, and then transferred to a second extruder. In such melt kneading, the processing temperature and rotational speed (rpm) are not particularly limited so long as they are within such processing temperature and rotational speed typically applied for the thermoplastic resin and reactive rubber, but it is advantageous within such ranges that the deterioration of the thermoplastic resin composition can be minimized and the composition can uniformly be kneaded.

The thermoplastic resin and the reactive rubber fed from the first extruder are kneaded in a second extruder equipped with a twin screw, and then continuously preparing an extrudate having a predetermined size and shape using an extrusion die, followed by press-molding, thereby forming a fiber-reinforced composite.

The fibers can be cut to long fibers having a suitable size to provide a sufficient rigidity to the extrudate extruded through the extrusion die, and the long fibers are subjected to a high shear stress within the extruder.

The method of producing a fiber-reinforced composite can be used to achieve high strength, high rigidity and excellent high-speed impact strength, and can therefore provide a fiber-reinforced composite applicable to components of automobile parts such as a back beam, a seat bag, a bonnet roof, and the like.

Hereinafter, preferred Examples of the present disclosure will now be described to provide a further understanding of the present disclosure. However, it should be noted that while the preferred examples are listed for easy understanding of the contents of the present disclosure, the present disclosure is not limited to these examples.

EXAMPLES AND COMPARATIVE EXAMPLES

Examples 1 and 2

A polypropylene resin and a reactive rubber were introduced into a first extruder, and melt kneaded to prepare a polypropylene resin composition. The polypropylene resin composition and a glass fiber were introduced into a second extruder, and kneaded to prepare a fiber-reinforced plastic composition. The prepared fiber-reinforced plastic composition was continuously extruded using an extrusion die, followed by a press molding, to prepare a fiber-reinforced composite.

The compositional ratios of each of the components are listed in Table 1 below. Here, the reactive rubber was EP200R (Polymirae product), which was formed by polymerization of 20% by weight of ethylene-propylene based rubber onto polypropylene chains, and the glass fiber had an average diameter of 17 μm. Further, the composition included a compatibilizer (maleic anhydride-grafted-polypropylene) and an antioxidant.

Comparative Example 1

A fiber-reinforced composite was prepared in the same manner as in Example 1, except that no reactive rubber was contained.

Comparative Example 2

A fiber-reinforced composite was prepared in the same manner as in Example 1, except that the reactive rubber was replaced by butadiene based rubber particles.

TABLE 1

|  | Ex. 1 | Ex. 2 | C. Ex. 1 | C. Ex. 2 |
| --- | --- | --- | --- | --- |
| Process | LFT-D | LFT-D | LFT-D | LFT-D |
| Polypropylene resin | 60 | 55 | 65 | 55 |
| Glass fiber | 30 | 30 | 30 | 30 |
| Compatibilizer | 2 | 2 | 2 | 2 |
| Heat-stabilizer | 3 | 3 | 3 | 3 |
| Reactive rubber | 5 | 10 | 0 | 10 (rubber particles) |
| Total | 100 | 100 | 100 | 100 |

EXPERIMENTS

Physical Properties of Fiber-Reinforced Plastic Composition

1) Falling ball impact strength: measured at room temperature (23° C.) according to ASTM D3763.
2) Impact absorption energy: measured by calculating a total area of Stress-Strain Curve obtained according to ASTM D790.
3) Flexural modulus: measured according to ASTM D790 using a versatile physical properties testing machine (UTM).

TABLE 2

|  | Ex. 1 | Ex. 2 | C. Ex. 1 | C. Ex. 2 |
| --- | --- | --- | --- | --- |
| Falling ball impact strength (J/mm) | 5.80 | 6.28 | 4.98 | 5.51 |
| Impact absorption energy (J) | 2.31 | 2.22 | 1.73 | 1.82 |
| Flexural modulus (GPa) | 5.76 | 5.35 | 5.83 | 4.84 |

As can be seen from Table 2, Examples 1 and 2 shows higher impact strength, impact absorption energy and flexural modulus, compared to Comparative Example 1 formed without a reactive rubber and Comparative Example 2 formed comprising rubber particles, and thereby Examples 1 and 2 were found to have improved impact performance compared to Comparative Examples 1 and 2.

INDUSTRIAL APPLICABILITY

The present disclosure provides a fiber-reinforced plastic composition, and a fiber-reinforced composite with improved impact performance prepared therefrom.

The invention claimed is:

1. A method of producing a fiber-reinforced composite, comprising:
introducing a thermoplastic resin and a reactive rubber into a first extruder, followed by melt-kneading, to form a thermoplastic resin composition;
introducing the formed thermoplastic resin composition and a fiber into a second extruder, followed by kneading, to form a fiber-reinforced plastic composition; and
molding the formed fiber-reinforced plastic composition to form the fiber-reinforced composite,
wherein the fiber-reinforced composite has a falling ball impact strength ranging from 5 J/mm to 7 J/mm.

2. The method of producing a fiber-reinforced composite of claim 1, wherein the step of molding the formed fiber-reinforced plastic composition to form the fiber-reinforced composite comprises continuously extruding the formed fiber-reinforced plastic composition using an extrusion die to form an extrudate having a constant size and shape; and press-molding the formed extrudate to produce the fiber-reinforced composite.

3. A fiber-reinforced composite, wherein
the fiber-reinforced composite is made from a fiber-reinforced plastic composition comprising:
a thermoplastic resin;
a reactive rubber; and
a fiber, and
the fiber-reinforced composite has a falling ball impact strength ranging from 5 J/mm to 7 J/mm.

4. The fiber-reinforced composite of claim 3, wherein the reactive rubber is a Reactor-made thermoplastic poly olefin (RTPO).

5. The fiber-reinforced composite of claim 3, wherein, in the fiber-reinforced plastic composition:
the reactive rubber is present in an amount ranging from about 1 part by weight to about 20 parts by weight based on 100 parts by weight of the thermoplastic resin, and
the fiber is present in an amount ranging from about 10 parts by weight to about 50 parts by weight based on 100 parts by weight of the thermoplastic resin.

6. The fiber-reinforced composite of claim 3, wherein the thermoplastic resin comprises at least one selected from the group consisting of an aromatic vinyl-based resin, a rubber-modified aromatic vinyl-based resin, a polyphenylene ether based resin, a polycarbonate based resin, a polyester based resin, a methacrylate based resin, a polyarylene sulfide based resin, a polyamide based resin, a polyvinyl chloride based resin, and a polyolefin based resin.

7. The fiber-reinforced composite of claim 6, wherein the thermoplastic resin comprises the polyolefin based resin, wherein the polyolefin based resin is a polypropylene resin, and wherein the polypropylene resin is a propylene homopolymer or an ethylene-propylene polymer.

8. The fiber-reinforced composite of claim 3, wherein the reactive rubber is formed by a polymerization of a rubber component onto a polypropylene chain.

9. The fiber-reinforced composite of claim 8, wherein the rubber component is at least one selected from the group consisting of an ethylene-propylene-based rubber, an α-olefin-based rubber, and a styrene-based thermoplastic elastomer.

10. The fiber-reinforced composite of claim 3, wherein the fiber comprises at least one selected from the group consisting of a glass fiber, a basalt fiber, a carbon fiber, and an aramid fiber.

11. The fiber-reinforced composite of claim 10, wherein the fiber comprises the glass fiber, and wherein the glass fiber has an average diameter ranging from 15 μm to 20 μm.

12. The fiber-reinforced composite of claim 3, wherein the fiber-reinforced plastic composition further comprises an additive.

13. The fiber-reinforced composite of claim 12, wherein the additive is at least one selected from the group consisting of an antioxidant, a heat stabilizer, a dispersant, a compatibilizer, and a pigment.

14. The fiber-reinforced composite of claim 3, wherein the fiber-reinforced composite has a flexural modulus of 5 GPa to 6 GPa.

15. The fiber-reinforced composite of claim 3, wherein the fiber-reinforced composite has an impact absorption energy ranging from 1.5 J to 3 J.

* * * * *